Jan. 28, 1969  R. S. BABINGTON  3,425,059
POWER HUMIDIFICATION APPARATUS
Filed April 12, 1967  Sheet 1 of 2
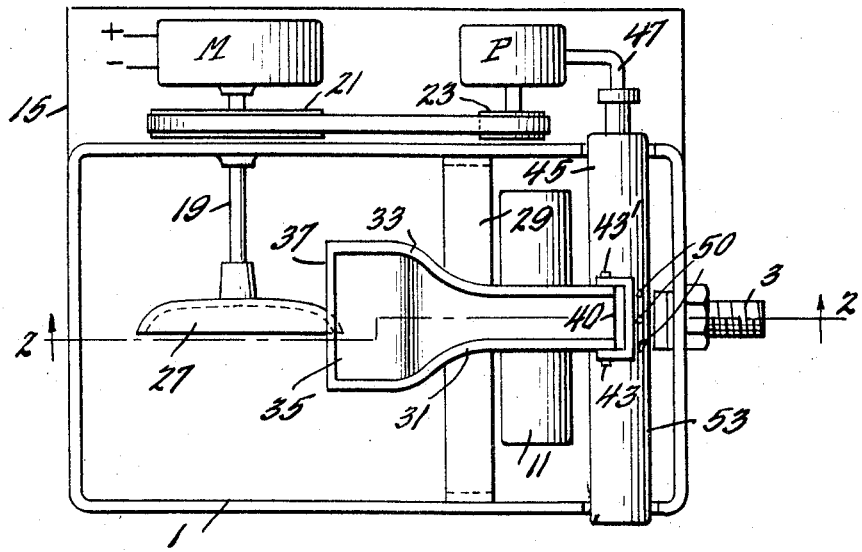
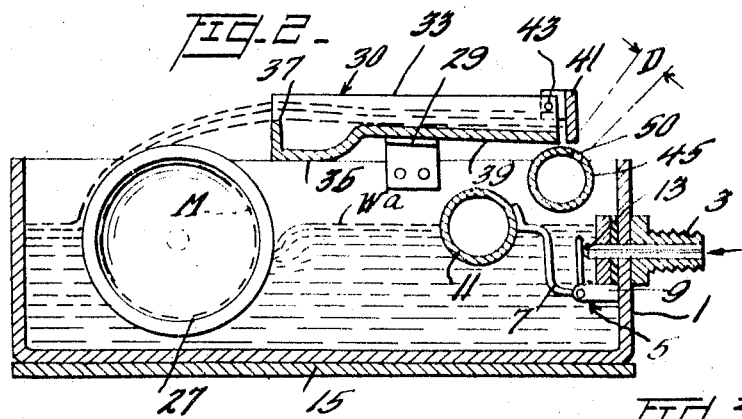
INVENTORS
Robert S. Babington
William R. Slivka
Albert A. Yetman,
BY Smith Michael Bradford
and Gardiner  ATTORNEYS

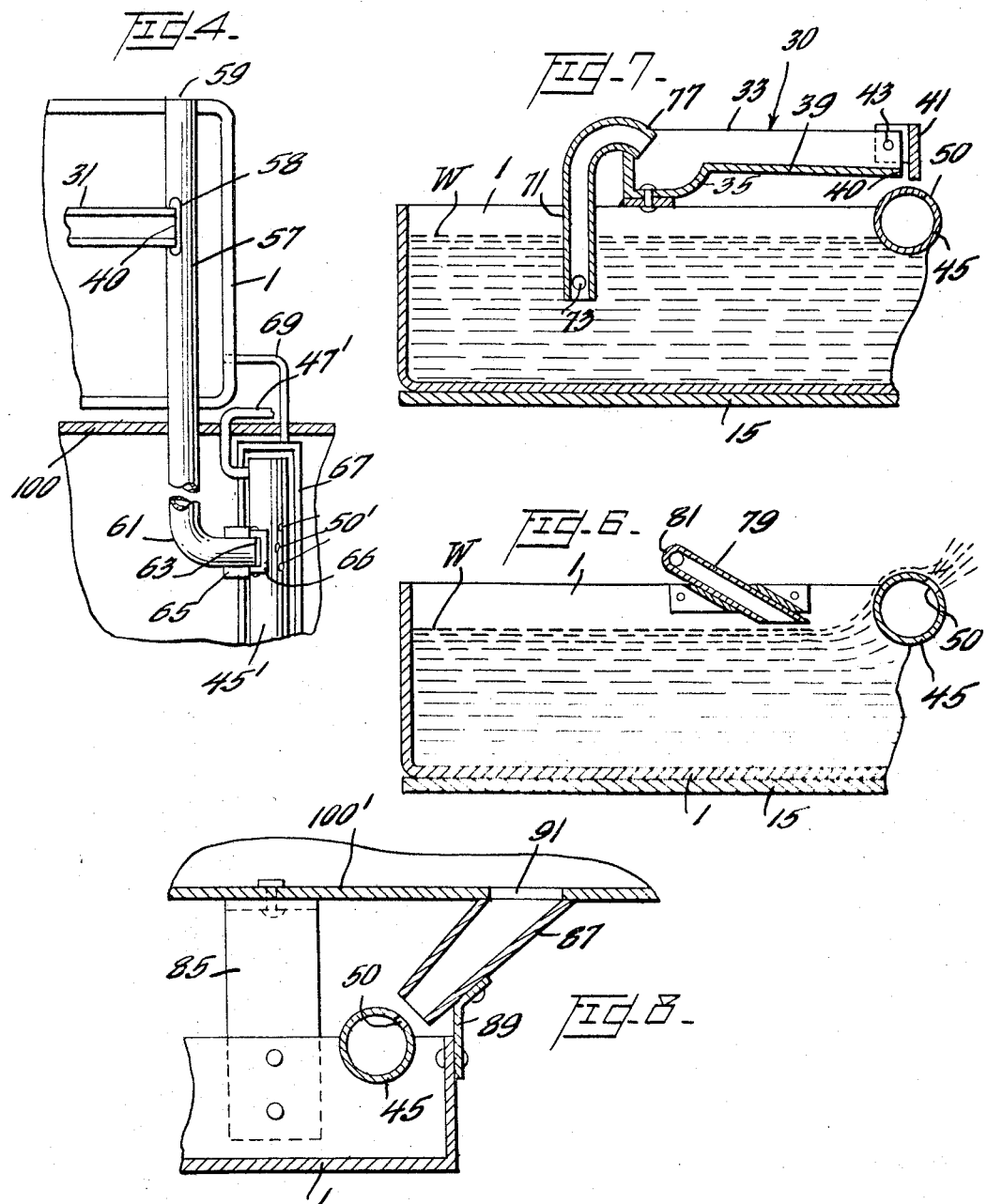

United States Patent Office 3,425,059
Patented Jan. 28, 1969

3,425,059
POWER HUMIDIFICATION APPARATUS
Robert S. Babington, 1113 Ingleside Ave., McLean, Va. 22101; Albert A. Yetman, 12316 Kembridge Drive, Bowie, Md. 20715; and William R. Slivka, 17 Shellflower Road, Levittown, Pa. 19056
Filed Apr. 12, 1967, Ser. No. 630,467
U.S. Cl. 261—29            14 Claims
Int. Cl. B50b 7/00

ABSTRACT OF THE DISCLOSURE

The disclosed subject matter is related to humidification apparatus designed to produce a spray of minuscule particles of water into the atmosphere of a home, commercial building or the like. It may have utility in conjunction with the conventional forced air type of heating system in use today or may be used as an independent source of air moisturization, and includes water conveying and agitating means to convey water from a reservoir to a perforated surface of an air plenum chamber.

---

This present invention is directed to a specific application of a unique spray forming apparatus and method to the area of home or industrial humidification. In particular, the invention is concerned with the addition to moisture to enclosed spaces, where due to variations in temperature and atmospheric conditions, control of the moisture content of the air in the enclosure is desirable for any one of a number of reasons as will be apparent as the description proceeds.

Numerous applications of the invention will occur to those skilled in the art, as the invention is defined in detail, particularly as regards industrial applications such as paper mill finishing rooms, or the like, where humidity control is often critical. For purposes of illustration and description, however, the invention will be described in terms of its application to forced air control heating units of the type commonly found in domestic structures or buildings, such as warehouses, apartments and the like.

In recent years, the matter of humidification of industrial buildings and residential property has received considerable attention. This is due to the recognition that the relative humidity within a structure, particularly a domestic dwelling, has considerable effect on the comfort of persons therein and also due to the fact that conditions of sustained low relative humidity can cause damage to structural elements as well as the contents therein such as furniture and the like. The effects are the result of dry air which tends to rob moisture from any substance containing extractable residual moisture for example, wood, wall board, plaster, etc., with the accompanying shrinkage, cracking, warpage, increased combustibility and in the case of furniture, for example, the moisture robbed from the glues used can actually result in complete structural failure as joints separate and pull apart. In fact, sustained conditions of low relative humidity can produce as much damage or detrimental effects as can the opposite condition, exposure to sustained conditions of excess humidity. Various solutions have been advanced in an effort to increase the moisture content of the air within enclosures, particularly where the enclosed air is heated, as by a forced air heating system. Such means include sprays of various types and evaporator surfaces such as capillary plates and rotating drums and the like.

While some degree of success results from the use of such devices, it has been found that is is difficult to attain the desired relative humidity (add moisture in sufficient amounts) where there is a high demand for absorption of water into the air as would be the case in a large enclosed structure during severe cold weather. Under such conditions due to continual heating and recirculation, the air within the structure becomes extremely dry. It has been found that the relative humidity within an enclosed space which is not humidified can drop as low as 6 to 8 percent which is considerably below the desired range of about 30 to 45 percent relative humidity, which has been established as a comfortable, healthful and safe range for normal living and industrial conditions.

Further, many such devices, particularly those based on the use of evaporative surfaces, are subject to continued operating and maintenance problems due to fouling of the surfaces with dirt and the usual mineral contaminates found in water, while the water reservoirs of these devices are subject to scumming and further contamination due to deposit therein of dirt, dust etc., from the surrounding air. Conventional spray type of humidification devices are also subject to operating difficulties due to plugging of ports and difficulty of regulation which can and does result more often than not, in condensation of free moisture on and around the device, creating more problems due to rusting of parts, ducts, etc., in the closely adjacent spray area.

When it is realized that the ability of air to absorb moisture is a function of the dryness thereof and, primarily of the condition of the liquid at the point of contact with the air, it is easily understood that the ideal condition of the liquid, usually water, should be such that same is literally suspended as a fog in the air with the droplets as small as is possible. The ideal condition of the spray should be such that the particles are spheroid in shape and perfectly uniform in size and distribution, the size being in the neighborhood of 50 microns or less. This present invention is predicated on these facts and therefore, is directed to a high capacity humidification apparatus which obviates the objection to evaporative humidifiers and spray type of moisturization systems, yet is more economically operated than both.

Accordingly an object of the invention is to produce a high capacitor humidifier which is economical to fabricate and operate.

Another object of the invention is to produce a humidifier capable of use in a variety of applications.

A further object of the invention is to provide a humidifier in which maintenance is reduced to a minimum.

Still another object of the invention is to produce a humidifier which overcomes scumming and deposit difficulties so prevelant as regards evaporative plate or drum type humidifiers, commonly in use in domestic structures.

Additionally, it is an object of the invention to produce a humidification apparatus which develops an ideal condition of the mositure for absorption by the air to be humidified.

Various other objects of the invention, not specifically set forth, but, none the less, inherent therein, will occur to those skilled in the art; all of said objects being attained by providing a water reservoir; means for supplying water on a demand basis to said reservoir; a reservoir agitator and water conveying means disposed in said reservoir; plenum means including a smooth but apertured surface receiving the water from said water conveying means; a pump for supplying air pressure to said plenum, said water being applied to the apertured surface at a point spaced from the aperture such that it flows as a film thereover, with the result that a portion of said film is diffused therefrom in a fine mist of minuscule particles closely approximating the characteristics of natural fog.

Having described the invention in general, attention is now directed to the following detailed description, reference being made to the drawings forming a part hereof, and wherein:

FIG. 1 is a top plan view of one form of an apparatus embodying the features of the present invention.

FIG. 2 is a side view partly in section, taken along the line 2—2 of FIG. 1.

FIG. 3 is a schematic wiring diagram illustrating one means of controlling the invention.

FIG. 4 is a partial plan view similar to FIG. 1 but showing a modification of the apparatus of FIGS. 1 and 2 which removes the reservoir from the atomizing operation and which is particularly applicable to use in furnace plenums, ducts and the like.

FIG. 5 is a side sectional view similar to FIG. 1, but showing a further modification of the air plenum means.

FIGS. 6 and 7 are further modifications of the apparatus and in particular are modifications applicable to the FIG. 1 structure, though used also with the modified apparatus of FIG. 5.

FIG. 8 is a modification showing a further means of introducing the spray into a duct such as used with a conventional domestic heating system.

Turning now to FIGS. 1 and 2, it may be seen that the apparatus includes a pan 1 defining a reservoir which may be filled with water through a fitting 3. Not shown, but conventionally affixed to fitting 3, is a water line which may convey water thereto from any suitable source. Fitting 3, in addition, may be provided with a float operated regulator and flow cut-off valve means 5. Essentially, this means 5 is simply a lever arm 7 pivotally mounted on a suitable bracket 9 and having one end connected to float 11 by any suitable means. The opposite end of lever arm 7 is provided with a sealing plug 13 which overlies the terminal end of supply fitting 3. Obviously, as the float is influenced by the water level W in the reservoir, the lever arm 7 is rocked about its pivot to open and close, as well as regulate, the flow through fitting 3. Such float operated valves are purely conventional in the art and form, per se, no part of the invention and need not be described further.

Pan 1 rests on a suitable support member 15 which, as shown in FIG. 1 extends outwardly beyond one edge of the bottom of the pan and to which are affixed, as by bolts, an electric motor M and an air pump P. Pump P is in this case, a positive displacement reciprocating pump of comparitively low capacity, developing pressures in the neighborhood of 4–12 p.s.i. Such pumps are well known and available through commercial outlets. An excellent example of such a pump is a so called "aquarium" pump used to pump air into the water of an aquarium tank.

Pump P, in this instance is driven from motor M via shaft 19 and pulleys 21 and 23. It should be recognized, however, that pump P could be separately driven by an electric motor or could be of a different type as, for example, a vibrator powered pump also readily available in commercial markets.

The motor shaft 19 extends into the interior of reservoir 1 and is provided at its terminal end with a disc or suction-cup shaped water pick-up wheel 27, the lower edge of which is immersed in the liquid within reservoir 1 so that its upper portion is above the fluid level W, as shown.

In close proximity to the periphery of the wheel 27 and supported on a suitable bracket 29 is trough member 30 having Vertical sides 31, 33 generally converging toward the end 40. It will be noted that the bottom 39 of trough 30 is inclined downwardly with its highest point terminating at the edge of a bowl-shaped area 35 at the wider end of the trough, the bowl-shaped area defining the terminal end 37 of trough 30 closely adjacent wheel 27. The lower end 40 of the trough 30 is partially closed by a gate 41 which is adjustably fixed, as by bolts or screws 43, 43', relative to the end 40, whereby the opening defined between gate 41 and the terminal end 40 may be adjusted for purposes to be described.

Positioned below the terminal and gated end 40 of trough 30, is a plenum chamber 45, which chamber is supplied by pump P and conduit 47 with air at the preferred pressures stated above. The chamber 45 in this case, is in the form of a cylindrical tube having in its surface 53 at least one aperture 50 opening from the interior of the tube to atmosphere. In the drawing, there are shown a plurality of apertures 50 but, as will become apparent, a single, properly shaped aperture may be preferable under many conditions.

It will be noted that the aperture or apertures 50 are displaced a distance D from the point where the water contacts the surface 53 of plenum chamber 45 until it reaches the aperture or apertures 50. The purpose of this spacing is to provide adequate time and area to permit the water to be spread in a thin film over the inclined surface 53 before it reaches the aperture or apertures 50. It has been found that it is essential that the liquid be in film form, hence internally stressed, before and after it reaches the aperture or apertures 50. The manner of inducing this internally stressed condition and various apparatus for so doing is the subject matter of copending applications and form no part, per se, of the present invention except in so far as the unique spraying devices and method are combined with the water agitating and conveying means to define a unique combination capable of performing the desired results in the specific area of enclosure humidification, thus defining a comparatively maintenance free, easily installed, highly efficient apparatus for such application.

For purposes of illustrating several forms of the invention, a further species is disclosed in FIGS. 4 through 8, with FIGS. 4, 6, 7 and 8 directed to modifications of the apparatus shown in FIG. 1 while FIG. 5 illustrates a modification of the apparatus shown in FIGS. 1 and 2 particularly as regards the air plenum means. It should be noted, however, that the FIG. 5 modifications is also completely compatible with and may be incorporated in the arrangements shown in FIGS. 4, 6, 7 and 8.

Turning now to FIG. 5, it will be seen that the further modification of the apparatus is comprised of a reservoir 1', a base plate 15', a water lifting wheel 27' mounted on shaft 19'. The reservoir 1' is provided with an inlet opening 103 which receives a float controlled water supply valve identical to the structure shown in FIG. 2. In fact as thus far described the FIG. 5, structure is identical with the FIG. 1 arrangement including the motor and pump arrangement disclosed in the latter drawing.

However, mounted on bracket 129 is a simple, rectangular, open topped reservoir 130 which has a portion 133 of one wall removed to provide an opening and shallow dam 135 through which water is thrown from wheel 27'. Because of the dam 135 a supply of water is maintained at a constant level in reservoir 130 as long as it is supplied by wheel 27'.

The bottom of reservoir 130 is provided with a circular or oval shaped aperture 141, which receives the "let" end of a hollow, boot shaped plenum chamber 145. The chamber is supplied, internally, with air under pressure through port 147 furnished by pump P via a suitable line and fitting (not shown) such as is chamber 45 of FIG. 1. The toe end of the chamber at 150 defines the film forming surface being provided with an aperture or apertures 153 over which the water film passes in its stressed condition and through which air emerges from the interior of the plenum 145.

The "leg" of generally vertical portion of the plenum is so configured as to fit within aperture 141 wherein it may be fixed by any suitable means, so long as a space is maintained between the front or "shin" portion of the plenum and the edge of aperture 141 so that water in reservoir 130 may flow down the vertical or leg portion of the plenum. Alternatively and preferably the opening could be located adjacent to an edge of the reservoir so that fluid would simply spill over the edge. After the liquid spills over the edge of reservoir 130 and begins to travel down the shin portion of the boot, towards the toe portion of the boot, the vertical shin serves two purposes. It serves the same purpose as the mechanical gate 41, shown in FIGURE 2, in that it acts to regulate the thickness of the film as it approaches the aperture in the toe of the boot. It does this simply because the gravitational effect acting on the downward flowing liquid insures the formation of a thin liquid film prior to the time the liquid passes over the toe portion of the boot. The obvious advantage to this method of controlling film thickness over the mechanical gate arrangement shown in FIGURE 2, is that the former is virtually clog-proof since the liquid flow to the toe portion of the boot is not mechanically restricted in any way. Consequently, there is no place for trash to collect as might be the case when considering the mechanical gate arrangement shown in FIG. 2. It has been demonstrated in actual tests with a boot configuration that trash introduced into the system which finds its way up into trough 130, merely spills over the edge of trough 130 down over the plenum, and into reservoir 1, in much the same manner as trash and sticks flow over a waterfall.

The vertical shin portion of the boot also provides the fluid film with sufficient kinetic energy to carry it over the toe portion of the boot where due to the spherical shape, it is forced to film out as it passes over and beyond aperture 153. As shown in our copending applications Ser. Nos. 605,777 and 605,779, both filed Dec. 29, 1966, a preferred shape of opening 153 is in the form of a thin, almost invisible, slot having walls which diverge outwardly from the interior to the exterior surface of the plenum chamber. However, by way of a complete disclosure, it has been found that a wide divergence of aperture sizes, shapes, and plenum chamber air pressures may produce a completely satisfactory spray. By way of example a round aperture with a diameter of .020 inch, located in a plenum operating at a pressure of 8 p.s.i.g. will produce a uniform spray of spherical particles (50 microns or less in diameter) and will disperse approximately 8 gallons of moisture into the air over a 24 hour period. If the walls of this aperture are made to diverge outwardly while still maintaining a minimum cross sectional diameter of .020 inch, the capacity of the aperture will be increased to 11 gallons of water per day. A further increase in capacity to 13 gallons of water per day can be realized by using a slit type aperture with a discharge flow area equivalent to that of a .020 inch diameter circular orifice. This data clearly shows how capacity can be increased (for a given airflow) by varying the aperture configuration in the toe of the boot. It has also been found that if a single aperture 153 is to be located in plenum 145, it is preferable that the aperture be located at the point where the cylindrical shape of the boot portion begins to make the transition to a spherical shape defining the tip of the boot. At this point, the cohesive force, and or surface tension factors are such that the liquid accelerating by gravity over the sphercial tip acts to pull and stretch the liquid approaching aperture 153 into a very thin and even film which is readily dispersed as a fine mist or fog by the air emerging from the plenum through aperture 153.

Turning now, once again to the FIG. 1 structure and in particular to the variation shown in FIG. 4, a further modification is shown, same being particularly adapted for use with the tubular form of plenum chamber shown in FIGS. 1 and 2.

In this form the particulars of the water inlet 13, the reservoir 1, the pump P, and trough 30 are unchanged, as is the location and operation of the water lifting wheel 27. However, as shown, instead of discharging directly on to the filming surface 53 of the plenum chamber 45, the fluid emitted from end 40 of trough 30 passes through an aperture 58 into the interior of a tubular conduit 57. This conduit 57, like trough 30, is inclined from one end 59 to the other end 61' the latter end being disposed over plenum chamber 45'. Chamber 45' is supported by a suitable bracket 65 from the end 61 of conduit 57 so that the aperture 50' is spaced downwardly of and away from lip 63, a distance which is equivalent to the distance D as in FIG. 1. Air is pumped into plenum 45' via conduit 47' as in the case of FIG. 1. The purpose of this structure will subsequently become apparent.

In FIG. 6 there is disclosed a further modification of the FIG. 1 apparatus. In this arrangement, the water lifting wheel and trough are dispensed with and in their place is provided a tube 79 suitable fastened to one side wall of the supply receptacle 1. One end of tube 79 terminates immediately above the surface W of the water and is spaced slightly rearwardly of the tubular plenum 45. The upper end of the tube opens at 81 into a terminal which may be joined, as in FIG. 1 to a line supplied with air under pressure from pump P. Any suitable and conventional T or Y fitting can be used to enable pump P to supply both the plenum 45 and tube 79.

When motor M is energized, the air from pump P pressurizes chamber 45 and is emitted from aperture 50. At the same time air flow through tube 79 creates a wake or wash on the surface of the water pool and the liquid is caused to flow over the top of the plenum where it films out either due to stress imparted thereto as it moves over the top of the plenum and begins its downward flow or because of the capillary attraction between the liquid and the material, for example glass, of which the conduit may be fabricated. As stated, this modification is particularly adapted to utility with the tubular plenum shown in FIG. 1 and FIG. 6.

An additional modification, equally adaptable for use with the "tube" or "boot" type plenum is disclosed in FIG. 7. In this structure there is the usual base plate 15, reservoir 1 and the trough 30-plenum 45 arrangement of FIG. 2 or the trough 130-plenum 145 arrangement of FIG. 5 as may be desired. In place of the conveying wheel there is provided a water lift tube 71. Air bled into the tube at 73 acts to draw water up through the interior of tube 71 where it is discharged from curved end 77 into the particular trough structure being used. In this case, as in the case of the arrangement of FIG. 6 the motor M may drive pump P directly, thus belt drive including pulleys 21 and 23 may be discarded and a simple Y connection from the pump P will supply both the lift tube 71 and plenum 45 or 145. It should be also noted that in some cases the troughs 30 or 130 may be eliminated and the end 77 of tube 71 discharged directly on the surface of tubular plenum 45 or the boot 145. In most cases, however, use of the troughs is preferred since the water flow over the plenum surfaces is much more positively directed with respect to the spray diffusing area.

Turning now to FIG. 8 another arrangement for duct application is shown in schematic partial plan form. This arrangement has utility with any of the arrangements previously described in that the reservoir 1 is simply suspended by a bracket 85 from the bottom of a conventional heating duct 100'. An aperture 91 is cut in the duct and mates with an inverted frusto- conical horn 87 which is mounted by bracket 89 on the end wall of reservoir 1. Thus liquid diffused from the plenum, irrespective of its form will be diffused upwardly through horn 87 and into the interior of duct 100'. It will be noted that the lower end of the horn is disposed over the reservoir so that any condensation, that may occur within horn 87 will be drained back into the reservoir.

Having described a basic form of the invention and several modifications thereof in terms of structure, consideration will now be given to the operation and advantages of same, reference being made to the schematic wiring diagram of FIG. 3. It should be noted that FIG.

3 is merely illustrative of one manner of and control for utilizing the apparatus.

As shown in FIG. 3 power is supplied to a switch T which may be the thermostatic switch of a furnace or the like. When switch T closes it also closes switch $T_1$ which is placed in the circuit to the humidifier motor M. The latter circuit also includes switch $H_2$ which is operated in response to the humidity as determined by the humidistat $H_1$. This sensing device is well known in the art, an example being that manufactured by the Minneapolis Honeywell Co., among others.

If, at the time of furnace operation, the relative humidity of the sensed environmental air is low, switch $H_1$ will be closed so that the humidifier motor M is energized. The water lifting wheel 27 begins to rotate lifting water from the reservoir to the trough 30 from which the water flows by gravity to the opening defined between gate 41 and the end 40 of the trough, for deposit on the surface 53 of plenum chamber 45. Due to the character of this surface 53, as described, the water spreads out or films as it approaches aperture 50.

Meanwhile air pressure has built up in plenum 45 and air is emitting from the interior thereof through aperture 50, so that, as the water film forms the air picks up this moisture which it diffuses into the surrounding atmosphere in the form of a fine mist or smoke. By regulation of the position of gate 39 the water flow to apertures or aperture 50, as the case may be, can be maintained at a sustained rate, adaquate for a given air pressure and aperture size, to assure continuous and dense smoke or fog generation which can be readily absorbed by the dry air. In fact the water thus created is so finely dispersed that under ordinary conditions it can be discerned as a heavy fog suspended above the plenum chamber 45.

As is believed obvious, the invention as shown in FIG. 4 is intended for use, as for example, in a central heating system so that only the plenum 45' and the end 61 of conduit 57 are exposed to hot air within a duct system, a wall thereof being illustrated in section as 100. The advantage of this arrangement is that the reservoir 1 as well as motor M and pump P can be disposed outside of the duct and hence, are not subject to heated air which tends to cause precipitation of minerals from the usual supply water scumming thereof and, at best, is not particularly helpful to the motor and or pump. In the configuration shown in FIG. 8, this design approach is carried one step further in that the entire unit is located outside of the hot air heating duct. With this arrangement, the hot air passing through the duct is not restricted in any way. Furthermore, installation of the humidifier is easier, and the entire humidifier operates in a cool environment.

In addition to the improved function as to water disbursement, several other advantages flow from the disclosed arrangement in that the water conveying means be it lifting wheel 27 or any of the other means, agitates the reservoir to prevent same from stagnating and scumming. Also because of the unique dispersing system there are no water ports or the like to plug up or become contaminated with mineral deposits. Additionally, operation of the device is positive and simple, while the cost of the various components is quite inexpensive. The only elements requiring service or susceptible to failure is pump or motor M either of which can be readily replaced and both of which can be purchased in versions assuring extremely long life with a minimum of operating costs.

Having thus described the invention in detail, it will be apparent that various changes and modifications may be made which fall within the spirit and scope hereof; the inventive concept being limited only as defined in the claims.

What is claimed is:

1. A humidification apparatus comprising a water reservoir, inlet means for supplying water to said reesrvoir on a demand basis; a plenum chamber including a film forming liquid receiving surface having at least one aperture therein; a water conveying and agitating means in said reservoir for conveying water therefrom onto the liquid receiving surface, the discharge from said means being deposited on said surface at a point spaced from said aperture whereby the water flows as a film over the aperture; means for supplying air, at a pressure greater than ambient pressure into said plenum chamber whereby said air discharges from said aperture and disperses a portion of said film into the atmosphere in the form of a smoke like fog.

2. The apparatus defined in claim 1, wherein the water conveying means comprises a rotating wheel having its lower periphery disposed within and in contact with the water in said reservoir.

3. The apparatus defined in claim 2 wherein said conveying means further includes a trough interposed between said rotating wheel and said water receiving surface.

4. An apparatus as defined in claim 3, wherein the lower end of said trough is provided with an adjustable gate for regulating water flow from said trough onto said liquid receiving surface.

5. An apparatus as defined in claim 1 wherein said water conveying means comprises a tube disposed above and having a terminal end adjacent the surface of the water in said reservoir and means for providing air under pressure to said tube whereby said air discharging from said end blows water onto the receiving surface of the plenum chamber.

6. An apparatus as defined in claim 1 wherein the liquid receiving surface of said plenum is provided with at least one aperture having an outwardly divergant peripheral wall.

7. The apparatus as defined in claim 6 wherein the aperture is in the form of an elongated slit disposed transverse to the path of movement of the water over said water receiving surface.

8. An apparatus for humidifying atmospheric air comprising a reservoir, inlet and outlet means in said reservoir, said inlet means including means regulating flow into said reservoir at a rate sufficient to maintain a water pool therein; a plenum chamber disposed adjacent the upper surface of said pool and having an apertured water receiving surface, water conveying and agitating means in contact with said pool and discharging water therefrom onto said water receiving surface of the plenum chamber, the position of said aperture in the water receiving surface of said chamber being below the point where said water discharge and agitating means discharges, whereby the water flows over the aperture in a film; means to supply air to said plenum chamber at a pressure greater than ambient pressure whereby said air discharges through said apertured receiving surface and disperses a portion of said liquid film into the atmosphere in the form of a smoke-like fog.

9. An apparatus as defined in claim 8 wherein said plenum chamber is in the form of a horizontal tube.

10. An apparatus as defined in claim 8 wherein said plenum is in the form of a boot having a vertical portion and a toe portion of spherical shape and wherein said aperture is located in the spherical toe portion and the point of water discharge is on the vertical portion whereby the water flows in a film over the spherical toe portion.

11. An apparatus as defined in claim 10 wherein there is a horizontal cylindrical portion of the boot interposed between said vertical portion and said spherical toe portion.

12. An apparatus as defined in claim 11 wherein at least one aperture is located at the point of transition between said horizontal cylindrical portion and said spherical toe portion.

13. An apparatus as defined in claim 10, wherein said apparatus includes means interconnecting said inlet and said outlet in said reservoir for recirculating water therein.

14. An apparatus as defined in claim 8 wherein said plenum is disposed within the duct of a conventional forced air heating system and said reservoir is located externally of said duct.

References Cited

UNITED STATES PATENTS

| | | | |
|---|---|---|---|
| 811,935 | 2/1906 | Leahy | 239—426 X |
| 1,978,566 | 10/1934 | Cole | 239—426 X |
| 2,212,418 | 8/1940 | Hamann | 126—113 |
| 2,651,869 | 9/1953 | Guenst | 239—220 X |
| 2,993,652 | 7/1961 | Curry | 239—338 X |
| 3,097,645 | 7/1963 | Lester | 239—338 |

HARRY B. THORNTON, *Primary Examiner.*

TIM R. MILES, *Assistant Examiner.*

U.S. Cl. X.R.

261—78, 116; 239—220, 426, 433; 126—113